F. D. JONES.
INHERENTLY KEYED GRAPHIC DRILL PROBLEM DEVICE.
APPLICATION FILED JULY 8, 1918.

1,296,965. Patented Mar. 11, 1919.

Fig. 1

Oral and SELF-KEYED Multiplication Problems
WITH MOVABLE GUIDE SHEATH

| | | Section X | | | | a' Section Y | | | | Section Z | | | |
|---|---|---|---|---|---|---|---|---|---|---|---|---|---|
| | | 2 | 3 | 4 | 5 | 6 | 7 | 8 | 9 | 10 | 11 | 12 | 8 | 9 | 11 | 12 |
| 1 | 2 | 4-8-9-3 | 2-5-8-1-4 | 3-7-4-2-9-6 | 9 |
| 2 | 3 | 5-4-2-6 | 9-7-2-6-8 | 4-7-5-1-2-3 | 8 |
| 14 | 8 | 3-6-7-3 | 5-4-1-7 8 | 9-3-5-7-4-5 | 3 |
| 15 | 9 | 2-3-6-9 | 5-2-6-4-7 | 6-4-9-7-0-7 | 8 |

2 3 6 9  a'/  5 2 6 4 7  c'  6 4 9 7 0 7
      9            9                9
  2 1 3 2 1 /  4 7 3 8 2 3    5 8 4 7 3 6 3

| 20 | 7 | 3-6-2-3 | 3-4-7-9-2 | 8-7-8-9-1-9 | 4 |
| 21 | 8 | 9-8-6-2 | 5-7-9-6-5 | 9-3-5-7-4-5 | 11 |
| 22 | 9 |   5-9-6 | 7-4-1-7-6 | 7-9-5  8-3-7 | 12 |
| | | 12 11 7 8 | 9 12 11 10 9 | 8 7 6 5 4 3 | |

Directions for Written Work: The sections at the top and the large figures at the side are used in selecting the problems to be worked. Use any line of figures in each section as a multiplicand, and the small figure at the left in such line as a multiplier, and each product will key.

The Key: Every alternate figure in the answer is one greater or one less than the preceding alternate figure. To read the key in the answer always begin at the left, because the unit figure is not included in the key, except in a few cases. There is no way of foretelling the answer figures. The work must be correctly done before the key appears

Fig. 3

Pupil
Teacher
120 Column Problem
120 Line Problems
360 Key Number Probl
Multiplication Tables thru 12
Oral or Written $a^2$ Section A

| 5×3= | 3×7= |
| 5×10= | 9×4= |
| 25×30 | 27×28 |

$C^2$
| 4×8= | 2×6=12 |
| 5×2= | 11×3=33 |
| 20×16 | 22×18 |

$C^3$
| 3×6= | 5×4= |
| 9×5= | 5×8= |

| × | × |
| 4×3= | 3×23= |
| 5×7= | 6×1= |
| × | × |
| 8×6= | 21×2= |
| 5×6= | 2×17= |
| × | ×a4 |
| 6×7=42 | 8×3= |
| 9×5=45 | 7×11= |
| 54×35 | ×a7 |

Fig. 2

Self-Keyed Multiplication Problems
MIXED NUMBERS   With Movable Guide Sheath

| | Section A | Section B | Section C | Section D |
|---|---|---|---|---|
| 1 | 43618 × 104 | 4352 × 211 | 15344 × 414 | 8644  3¾ |
| 16 | $1.71 537 | 285.26 $33.6 | 142.63 $6.72 | 10946 .08½ |

$1.71
 537
1197
 513
 855
$918.27

285.26
$33.6
17115
855 78
855 78
$958 4.73

| 20 | 35.2 19 2 | 8956 40.5 | 70.55 *97.2 | 58.73 16.32 |

Description: The sections at the top and the figures at the side make it easy to find quickly any desired problem. The sheath placed under the problem to be worked is a great help. The stars indicate that the unit figure of the answers is not included in the key.

Inventor
Frederick D. Jones

F. D. JONES.
INHERENTLY KEYED GRAPHIC DRILL PROBLEM DEVICE.
APPLICATION FILED JULY 8, 1918.

1,296,965.                    Patented Mar. 11, 1919.
                              5 SHEETS—SHEET 2.

Fig. 4

Self-Keyed Division

Chart No. 1   $d5$   $j'$   $d4$   $d5$

|   | Section A | Section B |   |
|---|---|---|---|
| $i'$-1 | 3) 1,087,542 | 9) 5,717,169 | 3) 1 |
| 2 | 4) 1,337,004 | 8) 4,370,976 | 4) 1 |
| 3 | 5) 4,136,820 | 7) 4,517,394 | 5) 2 |

MIXED NUMBERS
Self-Keyed Division Pr

Chart No. 2  $d6$   WITH GUIDE SHEATH  $j'$ $d6$

|   | $d7$ Section D | $d8$ Section E |   |
|---|---|---|---|
| $i''$-1 | 5⅔) 300189 | 49½) 2154537 | 94⅗) |
| 2 | 6⅚) 4963419 | 53⅓) 269280 | 95⅔) |
| 3 | 7⅓) 400818 | 57⅞) 4548591 | 96½) |
| 4 | 8⅚) 197107 | 58⅝) 4079362 | 97¾) |
| 5 | 9⅘) 317863 | 59⅝) 5130469 | 98⅘) |

$9\frac{4}{5} = \frac{49}{5}$   317863
                    5
49) 1589315
Ans. 32435  $d2$

Fig. 7

Self-Keyed Subtraction $j'$

|   | Section A | Section B |   |
|---|---|---|---|
| $h2$ | 6257 | 85201 | 6 |
| $h3$ 1 | 3723 | 65918 | 2 |
| $i'$ 2 | 8751 | 70132 | 9 |
|   | 3286 | 32647 | 3 |
| 3 | 7469 | 86142 | 8 |
|   | 3842 | 59768 | 3 |

Fig. 8

Pupil_____
Teacher_____
100 Column Problems   Per cent.
100 Line Problems      Per cent.
300 Key Figure Problems  Per cent.

Subtraction to 20   $j$   $a6$
        $t$   Section A   $a3$

| $m$- 9- 5= 4 | 13- 7= 6 |
| $s$- 3- 1= 2 | 6- 4= 2 | $a8$
| $h4$ 6- 4 | 2 | 7 - 3 | 4 |
| $a4$ 11- 7= $a7$ | 15- 9= $a5$ |
| 6- 3= | 9- 6= |
| 5- 4 | | 6- 3 |
| 13- 9= | 17- 8= |
| 6- 4= | 9- 4= |

Fig. 6

Drill No. 10 D. Keyed.

Pupil_____  Grade_____  School_____
Teacher_____  Date_____  Time_____

80 1st Divisor Problems   $e4$ Per cent  $j'$             Self-Keyed Number Drills
80 2nd Divisor Problems       Per cent       $e4$  $f2$
$e4$ 160 Two Divisor Problems  Per cent   $f3$         Division Tables thru 12.  $f3$  Oral or Written  $f2$
$e2$   Section A  $f2$ $e3$ Section B  $e2$ Section C   $e3$   Section D  $e2$ Section E   $f2$

| $g2$ 1f 3) 12= $f4$ 4 | 7) 27=( 3 ) | 4) 20= 5 | 8) 32=( 4 ) | 5) 30= 6 |
| 1$g$ 2) 6 | 2) 18  $f4$ $f5$ | 3) 12  $f4$ | 2) 16  $f4$ $f5$ | 4) 20  $f4$ |
| 1$e$ 7) 35= 5 | 4) 32=( 8 ) | 6) 24= 4 | 3) 21=( 7 ) | 5) 15= 3 |
|    3) 21 | 2) 8 | 3) 18 | 3) 9 | 5) 25 |
| $g2$  )18= | )56=( ) | )28= | )54=( ) | )40= |
|    2) 12 | 3) 24 | 2) 14 | 3) 27 | 4) 32 |
|    )25= | )48=( ) | )36= | )55=( ) |   |
|    3) 15 | 4) 48 | 4) 24 | 3) 33 |   |
|    | )60=( ) | )40= | )44 |   |
|    | 3) 36 | 6) 30 | 2) 22 |   |

Witness
C. C. Holly

Inventor
Frederick D. Jones
James R. Townsend
his atty.

F. D. JONES.
INHERENTLY KEYED GRAPHIC DRILL PROBLEM DEVICE.
APPLICATION FILED JULY 8, 1918.

1,296,965. Patented Mar. 11, 1919.
5 SHEETS—SHEET 3.

Fig. 9

Jones' 2,000 Addition Problems NO. 1

With Movable Guide Sheath

| Section D | | | | | | Section E | | | | | | Section F | | | | |
|---|---|---|---|---|---|---|---|---|---|---|---|---|---|---|---|---|
| 1 | 2 | 3 | 4 | 5 | | 1 | 2 | 3 | 4 | 5 | | 1 | 2 | 3 | 4 | 5 |
| 6 | 4 | 7 | 3 | 9 | | 2 | 7 | 3 | 6 | 5 | | 6 | 5 | 7 | 4 | 9 |
| 5 | 6 | 4 | 5 | 3 | | 8 | 3 | 7 | 2 | 6 | | 3 | 6 | 4 | 7 | 5 |
| 3 | 5 | 2 | 6 | 1 | | 7 | 2 | 6 | 3 | 5 | i | 3 | 4 | 2 | 5 | 1 |
| 7 | 2 | 6 | 3 | 5 | | 6 | 7 | 5 | 8 | 4 | | 4 | 5 | 3 | 4 | 2 |
| 4 | 3 | 5 | 4 | 7 | | 1 | 6 | 2 | 7 | 4 | h | 6 | 3 | 5 | 2 | 5 |
| 3 | 2 | 7 | 8 | 6 | | 3 | 2 | 4 | 1 | 6 | | 5 | 4 | 6 | 5 | 8 |
| | 2 | 7 | 3 | 6 | 5 | | 3 | 2 | 4 | 1 | 6 | | 5 | 4 | 6 | 5 | 8 |
| | 6 | 8 | 7 | 9 | 8 | | 5 | 9 | 6 | 8 | 7 | | 7 | 6 | 8 | 7 | 9 |
| | 7 | 2 | 6 | 3 | 5 | | 6 | 7 | 5 | 8 | 4 | f | 4 | 5 | 3 | 4 | 2 |
| 7 | 6 | 8 | 5 | 9 | b | 7 | 5 | 8 | 4 | 9 | | 5 | 4 | 6 | 3 | 7 |
| 3 | 1 | 2 | 0 | 2 | | 4 | 0 | 3 | 1 | 3 | e | 2 | 3 | 1 | 2 | 1 |
| 8 | 5 | 7 | 6 | 6 | c | 5 | 6 | 4 | 7 | 3 | | 7 | 4 | 6 | 5 | 5 |
| 2 | 3 | 1 | 4 | 1 | | 2 | 4 | 1 | 5 | 1 | d | 4 | 5 | 3 | 6 | 3 |
| 3 | 9 | 4 | 8 | 5 | d | 3 | 8 | 4 | 9 | 5 | | 4 | 7 | 5 | 8 | 6 |
| 1 | 4 | 2 | 3 | 4 | | 4 | 3 | 5 | 2 | 7 | c | 2 | 5 | 3 | 4 | 5 |
| 5 | 6 | 4 | 5 | 3 | e | 6 | 4 | 5 | 3 | 4 | | 3 | 7 | 2 | 8 | 1 |
| 6 | 0 | 5 | 1 | 5 | | 6 | 1 | 5 | 0 | 5 | b | 5 | 2 | 4 | 1 | 4 |
| 6 | 7 | 5 | 8 | 4 | f | 4 | 6 | 3 | 5 | 2 | | 7 | 3 | 6 | 2 | 5 |
| 4 | 3 | 5 | 4 | 7 | | 3 | 5 | 4 | 6 | 6 | a | 6 | 2 | 7 | 1 | 9 |
| 3 | 2 | 4 | 1 | 6 | g | 5 | 3 | 6 | 4 | 8 | | 2 | 6 | 3 | 7 | 5 |
| | 3 | 2 | 4 | 1 | 6 | | 5 | 3 | 6 | 4 | 8 | | 2 | 6 | 3 | 7 | 5 |
| | 4 | 8 | 3 | 9 | 2 | h | 2 | 7 | 3 | 8 | 4 | | 4 | 9 | 3 | 8 | 2 |
| | 6 | 7 | 5 | 8 | 4 | | 4 | 6 | 3 | 5 | 2 | | 7 | 3 | 6 | 2 | 5 |
| | 7 | 4 | 8 | 5 | 9 | i | 6 | 9 | 7 | 8 | 8 | | 8 | 5 | 7 | 4 | 6 |
| | 5 | 1 | 6 | 0 | 8 | | 7 | 2 | 6 | 1 | 6 | | 5 | 0 | 6 | 1 | 8 |
| | 2 | 5 | 1 | 4 | 1 | | 3 | 0 | 2 | 1 | 2 | | 1 | 4 | 2 | 5 | 4 |

Self-Key: Add the columns of any section from the top to sheath placed on any of the lines between the letters and the five right hand figures of the answers, if correct, will key by every alternate figure being one greater or one less than the preceding alternate figure. Exceptions. When the sheath is on the lines above D or K then the unit figure of the answers will be two greater than the preceding alternate figure.

Fig. 10

Section A

| 6 | + | 4 | + | 7 | + | 6 | = | 23 |
| 3 | + | 4 | + | 3 | + | 3 | = | 13 |

9 + 8 + 10 + 9 | 36

| 3 | + | 6 | + | 7 | + | 8 | = | 24 |
| 4 | + | 5 | + | 1 | + | 4 | = | 14 |

+ + +

| 4 | + | 5 | + | 7 | + | 3 | = |
| 9 | + | 3 | + | 7 | + | 6 | = |

Fig. 11

Section A

| 1 | 2 | 3 | 4 | 5 | 6 |
|---|---|---|---|---|---|
| 5+ | 8+ | 1+ | 7+ | 3+ | 6 |
| 8+ | 5+ | 6+ | 7+ | 4+ | 8 |
| 4+ | 1+ | 8+ | 2+ | 6+ | 4 |

17 + 14 + 15 + 16 + 13 + 18

| 3+ | 9+ | 2+ | 6+ | 5+ | 7 |
| 5+ | 6+ | 7+ | 8+ | 9+ | 9 |
| 6+ | 0+ | 7+ | 3+ | 4+ | 3 |

Fig. 12

| A | B | C | D |
|---|---|---|---|
| pe 4 + 3 + 4 + 2 = 13 |
| rp 7 + 5 + 6 + 3 = 21 |
| i 2 + 1 + 3 + 2 = 8 |
| pu 3 + 5 + 2 + 6 = 16 | ai 16 + 14 + 15 + 13 | 58

| pp 5 + 1 + 2 + 3 = |
| ee 8 + 9 + 7 + 7 = |
| pu 1 + 6 + 4 + 5 = |
| pn 3 + 2 + 3 + 2 = |

+ + +

Inventor
Frederick D. Jones
by James R. Townsend
his atty

Witness
C. C. Holly

F. D. JONES.
INHERENTLY KEYED GRAPHIC DRILL PROBLEM DEVICE.
APPLICATION FILED JULY 8, 1918.

1,296,965. Patented Mar. 11, 1919.
5 SHEETS—SHEET 4.

Jones' 1,000 Self Keyed Addition Problems

With Movable Guide Sheath

| | Section A | | | | | | Section B | | | | | | Section C | | | | | |
|---|---|---|---|---|---|---|---|---|---|---|---|---|---|---|---|---|---|---|
| | 1 | 2 | 3 | 4 | 5 | | 1 | 2 | 3 | 4 | 5 | | 1 | 2 | 3 | 4 | 5 | |
| | 4 | 7 | 5 | 6 | 7 | | 2 | 4 | 1 | 5 | 1 | | 6 | 0 | 7 | 1 | 9 | |
| A | 7 | 2 | 6 | 3 | 5 | | 3 | 5 | 2 | 4 | 1 | | 7 | 9 | 6 | 8 | 5 | |
| | 5 | 4 | 4 | 3 | 3 | | 7 | 5 | 8 | 6 | 9 | i | 3 | 8 | 2 | 9 | 1 | L |
| B | 8 | 5 | 7 | 6 | 6 | | 5 | 4 | 4 | 3 | 3 | | 3 | 1 | 2 | 0 | 1 | |
| | 2 | 3 | 3 | 4 | 5 | | 6 | 6 | 7 | 7 | 9 | h | 2 | 6 | 3 | 7 | 5 | K |
| C | 1 | 6 | 2 | 5 | 4 | | 4 | 3 | 5 | 2 | 7 | | 6 | 3 | 7 | 2 | 9 | |
| | 1 | 6 | 2 | 5 | 4 | | 4 | 3 | 5 | 2 | 7 | g | 6 | 3 | 7 | 2 | 9 | J |
| D | 7 | 3 | 6 | 4 | 5 | a | 6 | 6 | 5 | 7 | 4 | | 7 | 6 | 6 | 7 | 5 | |
| | 8 | 2 | 7 | 3 | 6 | | 5 | 2 | 4 | 3 | 3 | f | 3 | 2 | 2 | 3 | 1 | I |
| E | 3 | 7 | 2 | 6 | 1 | b | 5 | 7 | 4 | 6 | 3 | | 4 | 7 | 3 | 6 | 2 | |
| | 2 | 5 | 3 | 4 | 5 | | 3 | 7 | 4 | 8 | 6 | e | 2 | 8 | 3 | 9 | 5 | H |
| F | 8 | 4 | 7 | 5 | 6 | c | 8 | 2 | 7 | 1 | 6 | | 7 | 1 | 6 | 0 | 5 | |
| | 6 | 3 | 7 | 4 | 9 | | 4 | 5 | 5 | 4 | 7 | d | 5 | 3 | 6 | 2 | 8 | G |
| G | 5 | 6 | 6 | 5 | 7 | d | 7 | 4 | 8 | 5 | 9 | | 6 | 6 | 7 | 7 | 8 | |
| | 1 | 3 | 2 | 4 | 4 | | 1 | 3 | 2 | 2 | 4 | c | 2 | 5 | 3 | 4 | 5 | F |
| H | 2 | 6 | 3 | 5 | 4 | e | 4 | 6 | 5 | 7 | 6 | | 7 | 4 | 8 | 5 | 9 | |
| | 4 | 8 | 3 | 7 | 3 | | 2 | 2 | 1 | 1 | 1 | b | 3 | 3 | 2 | 2 | 2 | E |
| I | 5 | 1 | 4 | 2 | 3 | f | 6 | 7 | 5 | 8 | 4 | | 8 | 6 | 7 | 7 | 6 | |
| | 7 | 7 | 6 | 6 | 6 | | 5 | 8 | 4 | 9 | 4 | a | 2 | 4 | 1 | 3 | 1 | D |
| J | 4 | 2 | 5 | 3 | 7 | g | 3 | 1 | 4 | 0 | 6 | | 1 | 5 | 2 | 6 | 4 | |
| | 4 | 2 | 5 | 3 | 7 | | 3 | 1 | 4 | 0 | 6 | | 1 | 5 | 2 | 6 | 4 | C |
| K | 3 | 7 | 2 | 6 | 1 | h | 7 | 8 | 6 | 9 | 5 | | 3 | 4 | 2 | 3 | 1 | |
| | 5 | 8 | 4 | 7 | 3 | | 6 | 1 | 5 | 2 | 4 | | 8 | 9 | 7 | 8 | 6 | B |
| L | 7 | 1 | 8 | 2 | 9 | i | 5 | 8 | 4 | 7 | 3 | | 7 | 0 | 6 | 1 | 5 | |
| | 6 | 5 | 7 | 4 | 9 | | 2 | 7 | 3 | 6 | 5 | | 6 | 8 | 7 | 9 | 9 | A |
| | 2 | 4 | 1 | 5 | 1 | | 4 | 2 | 5 | 3 | 7 | | 2 | 1 | 3 | 0 | 5 | |

DESCRIPTION The sections and the dark figures at the top are used to select the columns to be added. The letters on the sides are used to designate the length of the columns to be added.

Inventor
Frederick D. Jones

Witness
C. C. Holly

James R. Townsend
his atty

F. D. JONES.
INHERENTLY KEYED GRAPHIC DRILL PROBLEM DEVICE.
APPLICATION FILED JULY 8, 1918.

1,296,965. Patented Mar. 11, 1919.
5 SHEETS—SHEET 5.

Fig. 14

Pupil .......... Grade .......... School ..........
Teacher .......... Date .......... Time ..........

60 Column Problems — Per cent.
60 Line Problems — Per cent.
120 Key Number Problems — Per cent.

Self-Keyed Number Drills

Division of Fractions — Oral or Written

| Section A | Section B | Section C | Section D | Section E |
|---|---|---|---|---|
| $\tfrac{1}{8}$) $\tfrac{1}{4}$ = 2 | $\tfrac{1}{6}$) $\tfrac{2}{3}$ = 4 | $\tfrac{1}{2}$) $\tfrac{1}{2}$ = 6 | $\tfrac{3}{8}$)$1\tfrac{1}{2}$ = 4 | $\tfrac{1}{6}$) $\tfrac{1}{3}$ = 2 |
| 4 ) $\tfrac{1}{2}$ | 2 ) $\tfrac{1}{3}$ | 3 ) $\tfrac{1}{4}$ | 2 ) $\tfrac{3}{4}$ | 4 ) $\tfrac{2}{3}$ |
| ) $1\tfrac{1}{2}$ = 6 | ) $1\tfrac{1}{2}$ = 8 | ) $1\tfrac{1}{3}$ = 6 | ) $\tfrac{2}{5}$ = 4 | ) $1\tfrac{2}{3}$ = 2 |
| 2 ) $\tfrac{1}{2}$ | 4 ) $\tfrac{3}{4}$ | 3 ) $\tfrac{2}{3}$ | 8 ) $\tfrac{4}{5}$ | 1 ) $\tfrac{5}{6}$ |
| ) 8 = | ) 4 = | ) 21 = | ) 6 = | ) 4 = |
| $1\tfrac{1}{2}$ ) 4 | $2\tfrac{1}{2}$ ) 2 | $2\tfrac{1}{3}$ ) 7 | $4\tfrac{1}{2}$ ) 3 | $3\tfrac{1}{2}$ ) 2 |
| ) $1\tfrac{1}{2}$ = | ) $1\tfrac{1}{2}$ = | ) 1 = | ) 6 = | ) 8 = |
| 4 ) $\tfrac{1}{2}$ | 7 ) $\tfrac{3}{4}$ | 8 ) $\tfrac{1}{2}$ | $4\tfrac{2}{3}$ ) 2 | 6 ) 4 |
| ) 24 = | ) 4 = | ) 9 = | ) 2 = | ) $1\tfrac{1}{2}$ = |
| 3 ) 8 | $5\tfrac{1}{2}$ ) 2 | $4\tfrac{1}{3}$ ) 3 | $3\tfrac{2}{3}$ ) $\tfrac{2}{3}$ | $6\tfrac{1}{2}$ ) $\tfrac{3}{4}$ |
| ) $6\tfrac{1}{2}$ = | ) 8 = | ) $6\tfrac{1}{2}$ = | ) 33 = | ) $\tfrac{2}{3}$ = |
| $8\tfrac{2}{3}$ ) 13 | $3\tfrac{3}{5}$ ) 4 | $8\tfrac{2}{3}$ ) 13 | $2\tfrac{1}{5}$ ) 11 | $4\tfrac{1}{3}$ ) $\tfrac{1}{5}$ |
| $1\tfrac{1}{3}$) 3 = 2$\tfrac{1}{4}$ | $\tfrac{3}{5}$) $2\tfrac{1}{2}$ = 4$\tfrac{1}{6}$ | 8 ) 50 = 6$\tfrac{1}{4}$ | $\tfrac{1}{3}$) $1\tfrac{1}{2}$ = 4$\tfrac{1}{2}$ | $\tfrac{1}{5}$) $1\tfrac{1}{4}$ = 6$\tfrac{1}{4}$ |
| $4\tfrac{1}{2}$ ) 6 | $8\tfrac{1}{3}$ ) 5 | $3\tfrac{1}{8}$ ) 25 | $2\tfrac{1}{4}$ ) $\tfrac{3}{4}$ | $3\tfrac{1}{8}$ ) $\tfrac{5}{8}$ |

Fig. 15

Pupil .......... Grade ... School ....
Teacher .......... Date .... Time ....

40 Empty Pens — Per Cent
10 Big Pens — Per Cent
50 Pens — Per Cent

Addition Game, Self-Keyed

Pigs In Pens

| 3 + 2 = 5 | 3 + 5 = 8 |
| 1 + 4 = 5 | 2 + 2 = 4 |
| 4 + 6 = 10 | 5 + 7 = 12 |
| 2 + 2 = | 1 + 4 = |
| 1 + 3 = | 3 + 2 = |
| + = | + = |

Fig. 16

Pupil .......... Grade ... School ....
Teacher .......... Date .... Time ....

40 Empty Pens — Per Cent
10 Big Pens — Per Cent
50 Pens — Per Cent

Subtraction Game, Self-Keyed

Pigs In Pens

| 7 − 4 = 3 | 10 − 4 = 6 |
| 3 − 2 = 1 | 5 − 3 = 2 |
| 4 − 2 = 2 | 5 − 1 = 4 |
| 9 − 4 = 5 | 11 − 5 = 6 |
| 3 − 1 = 2 | 4 − 3 = 1 |
| 6 − 3 = 3 | 7 − 2 = 5 |

Witness
C. C. Holly

Inventor
Frederick D. Jones
by James R. Townsend
his Atty.

UNITED STATES PATENT OFFICE.

FREDERICK D. JONES, OF ALHAMBRA, CALIFORNIA.

INHERENTLY-KEYED GRAPHIC DRILL-PROBLEM DEVICE.

1,296,965.     Specification of Letters Patent.     Patented Mar. 11, 1919.

Application filed July 8, 1918. Serial No. 243,975.

*To all whom it may concern:*

Be it known that I, FREDERICK D. JONES, a citizen of the United States, residing at Alhambra, in the county of Los Angeles and State of California, have invented a new and useful Inherently-Keyed Graphic Drill-Problem Device, of which the following is a specification.

This invention relates to the art of education and to didactic apparatus for use in such art in public and private schools and at home; and in fact, wherever it is possible to give practical drill with written problems. The invention is embodied in a novel manufacture consisting of one or more arrangements of printed or written problems of a novel character which involves the principle that some distinguishing order of digits shall inhere in the answer involved in the numbers written and the process indicated.

Each of the arrangements, of graphically produced problems, is constructed with numbers arranged in a predetermined relation indicating a certain problem solving process, and involving a certain answer, elements of which answer will appear in a definite order when the answer is graphically produced, thus presenting to the eye, in the correct written answer, a key that is not likely to occur in an incorrect result.

This invention relates to devices designed for drill work of pupils and other students, and objects are to increase the interest of the student, to increase his accuracy, and to minimize mental effort upon the part of the student and of the person viséing the work done by the student.

This invention is applicable to arithmetical drill work and is broadly new, basic and pioneer in that it comprises an educational device provided with a problem, the elements of which inherently involve a result containing elements arranged in an order appearing only at the correct completion of the work, so that by noting whether or not the result obtained exhibits the known order, the student and inspector can instantly determine as to the correctness of the work.

An object is to insure accuracy without consuming time or imposing the mental effort required to compare the student's result with a given answer.

So far as I am aware, there has never heretofore been suggested any device corresponding to or resembling in any way that which I have invented in this behalf and which I term a graphically expressed inherently keyed drill problem.

The invention includes the graphical drill problem and also a drill sheet provided with a number of the drill problems; and also includes arrangements of such problems on the sheet as will hereinafter more fully appear.

An object is to enable a student to satisfactorily visé his own problems, subject to a further viséing by the instructor, if desired, without any likelihood that the student may use the key for the purpose of deceiving himself, the instructor, or others.

An object is to provide a maximum number of problems in clear print within a minimum space for practical number drills; and to enable the teacher to see by a glance at the completed result, without calculation and without looking at a separate key, whether or not the work is correct.

An object of the invention is to provide self-keyed arithmetical drills or problems in which the key is very simple and will enable the teacher, pupil or other interested person familiar with the principle of the key, to tell at a glance whether the work of the pupil is correct or incorrect; to provide a key system in which the key that denotes the correctness of the answer does not appear until the problem is correctly worked, so that each pupil may be put in possession of the key, and thus be enabled to check his work, before, or without, inspection by the teacher; thus giving to the pupil security against passing an incorrect answer to the teacher for inspection and yet without affording the pupil an opportunity for exercising dishonesty.

An object is to provide a novel system for assuring the pupil as to the correctness of his work and to do this without giving the pupil such opportunity for relying upon the efforts of others as is afforded by placing the answers in the back of the arithmetic or any other place available to the pupil. An object is to supply the answer without foretelling it.

An object is to provide means whereby a practically unlimited drill may be given the pupil, so that he may attain accuracy and rapidity without burdening the teacher with any great labor to determine the character of the pupil's work.

An object is to provide a number chart by the use of which contests for accuracy and speed are easily arranged.

An object is to economize to the utmost the time of the pupil and teacher in giving the pupil number drill.

A further object is to accomplish these results at a cost so small that school boards can well afford to supply each pupil with the chart suited to its grade.

Another object is to make provision whereby the teacher may shorten or lengthen the problems without confusing the key, so that the work of the pupil may be greatly varied without correspondingly increasing the work of the teacher.

The invention is applicable in various ways and I do not limit its application to any specific problems and I shall illustrate the same herein as applied to the four fundamental principles of arithmetic, viz., addition, subtraction, multiplication and division.

An object is to afford the teacher means by the aid of which he can easily make for the pupil concrete test problems and test the pupil with perfect accuracy without expending any mental effort to determine the correctness or incorrectness of results obtained by the pupil. An object is to provide superior accuracy tests for counting machine operators.

Other objects, advantages and features of novelty may appear from the accompanying drawings, the subjoined detail description and the appended claims.

The accompanying drawings illustrate the invention.

Figure 1 is a fragmental view of a chart constructed in accordance with this invention as applied to multiplication and adapted for both oral and written work, the key for each written answer appearing in such answer individually.

Fig. 2 is a fragmental view of a chart analogous to the chart of Fig. 1 and constructed in accordance with the invention as applied with multiplication for written work only.

Fig. 3 is a fragmental view of a drill chart in which the key appears in a related set of answers.

Fig. 4 is a fragmental view of a self keyed division chart, with answers to the last two problems in the open space below.

Fig. 5 is a fragmental view of a self keyed division chart involving mixed numbers. The solution of one of the problems is shown on the guide sheath.

Fig. 6 is a fragmental view of a drill shaft constructed in accordance with this invention in which the key is contained in the answers of sets or groups of problems. Some of said answers are shown.

Fig. 7 is a fragmental view of a self keyed subtraction chart, constructed in accordance with this invention; the key for the answer being found in such answer, not shown.

Fig. 8 is a fragmental view of a self keyed subtraction chart in which the individual answers to a set or group of four problems are combined to exhibit the key.

Fig. 9 is a view of an addition chart constructed in accordance with this invention and provided with two guide sheaths, the answer key being supplied in a number contained in the problem itself.

Fig. 10 is a fragmental view of a self keyed addition chart in which the individual answers to one set or group of four problems are combined to exhibit the key for the answers to such set.

Fig. 11 is a fragmental view of another addition chart in which the key is found in the individual answers of a group of six problems.

Fig. 12 is a fragmental view showing another construction of addition chart with a keyed answer of the group character.

Fig. 13 is a view of a zigzag answer addition sheet.

Fig. 14 is a fragmental view of a keyed division of fractions sheet.

Figs. 15 and 16 illustrate simple mathematical game sheets for teaching addition and subtraction to beginners.

Referring first to Fig. 1 the multiplicands $a'$ are separated by the horizontal ruling $b'$ and vertical ruling $c'$ and are arranged in a group comprising columns and lines, the digits of each line being separated by hyphens $d'$ to facilitate the use of the chart for oral work.

The group of problems is surrounded by columns and rows of multipliers. The numbers of the top row $e'$ of the multipliers are in numerical order from 2 to 12, inclusive.

The bottom row of multipliers $f'$ is made up of the more difficult numbers arranged promiscuously. The columns $g'$ and $h'$ of multipliers are made up of numbers arranged promiscuously.

The lines $i'$ of problems are numbered from unity to the full number of lines, the same being 22 in the instance shown.

The columns of hyphenated numbers between the column rulings $c'$ are provided with indicia $j'$ as "section X," "section Y" and "section Z."

The characters $i'$ and the indicia $j'$ afford a reference by which the teacher can indicate the particular problem to be solved.

Each multiplicand as $a'$, in combination with a multiplier, as $g'$, noted by the small figure on the left, involves two elements comprising a multiplicand and a multiplier in horizontal alinement with each other; and these elements inherently involve a result containing elements arranged in predetermined order, determinable only from said result. For example, the result $k'$ is made up of the elements 2, 3, 6, 9 as multiplicand and 9 as multiplier, and these elements involve the answer 21321. In this instance, the predetermined order is that the alternate figures, except unity, increase by one from left to right. The same order is found in answers $k''$ and $k'''$; the alternate key figures in the answer $k''$ being 432 and also 78; while the alternate key figures in answer to $k'''$ are 543 and also 876.

The inspector is only required to note the order of the numerals in each answer and if the predetermined order does not appear, it is at once known that the answer is incorrect and the pupil may be required to do the work over.

In the problems shown on the chart of Fig. 1, each answer is provided with two series of alternate numbers keying in the way just explained.

The system is not limited to applying the key by means of numerals in alternate succession, nor to the numbers increasing in any one particular direction; care being taken, however, that the keys for any chart shall be uniform throughout the problems of such chart so as to avoid confusion. The form that I have shown, however, is the form that I consider thoroughly practical. Other practical forms of the chart are shown in succeeding views.

In Fig. 2 the cross-index is made up of the indicia $i''$ and $j''$, and the problem is made up of the multiplicands $a''$ and multipliers $e''$. The answer $k^2$ is made up of the two sets of alternate numerals 987 and 12, the one set decreasing from left to right and the other set increasing from left to right. In the answer $k^3$ the alternate numerals 9876 of one series and 543 of the other series of the key decrease by unity from left to right.

In Fig. 3 the individual problem is made up of rows of multiplicands $a^2$ and rows of multipliers $b^2$, resulting in rows of individual answers $c^2$ of the problems made up of the superposed multiplicand and multiplier. The individual answers $c^2$ of any row of four problems in this chart are in predetermined relation to each other; the alternating answers $c^2$ differing from each other by 2; as 25, 27, and 30, 28; the elements of the first series 25, 27 increasing from left to right and the elements of the second series 30, 28 decreasing from left to right.

In the answers $c^3$ the alternating series 20, 22 and 16, 18 both increase from left to right.

This alternate and alternative increasing and decreasing of the numbers or numerals going to make up the answers, being under the will of the constructor, enables him to add variety to the examples thus to make it impossible to foretell the answers, although as soon as all the answers for a series of problems are produced by the person doing the practice work, the correctness or incorrectness of the series of answers is positively determined.

In Fig. 4 the quotient as at $c^4$ is made up of two series of alternate figures as 876 and 234 for the problem pointed out by the indicia, line "3", "section A", and 654 and 432 in line "3", "section B."

In Fig. 5 the quotient $d^2$ is made up of two series of alternative figures 345 and 23 for the problem pointed out by the indicia "5", "section D", and so on throughout the whole chart.

In the chart shown in Fig. 6 there are four series of alternate quotients or answers in each completed line. For example, the series $e^2$ includes quotients 3, 4, 5; the series $e^3$ includes the quotients 9, 8; the series $f^2$ includes the quotients 4, 5, 6; and the series $f^3$ includes the quotients 3, 4. The quotients of the related series are distinguished by adjacent markings. Thus the quotients of the series $e^2$ and $e^3$ are distinguished by the division indicating parentheses $e^4$; the related quotients $f^2$, $f^3$ are adjacent the equals mark $f^4$ and the quotients of the series $f^3$ are set off from the quotients of $f^4$ by inclosure in parentheses $f^5$. By these markings $e^4$, $f^4$ and $f^5$ the eye is readily directed to the key figures of any series. The quotients 3, 9, 4, 8, 5 are seen to be related because they stand within the parentheses $e^4$. Quotients 4, 3, 5, 4, 6 are seen to be related because they follow the equals mark $f^4$; and the quotients $f^3$ inclosed within the parentheses are distinguished from the quotients $f^2$ not inclosed by parentheses. By these various markings, when a sheet of problems is completed, the eye of the inspector may observe at a glance any set of related quotients without confusing with any of such quotients any of the quotients unrelated to such set.

In this form of chart a condensed form of problem is employed including in the first instance a permanent dividend $1^e$, a permanent divisor $1^g$, and a first quotient $e^2$ derived from said dividend and divisor. This first quotient for each first problem is placed by the student in a vacant space $g^2$ prepared therefor above the first divisor $1^g$, and these quotients throughout any line of problems are thus arranged in a line and the quotients of each line are arranged in two series, $e^2$ and $e^3$ of alternate quotients as above set forth. These quotients are used as divisors for an upper set of problems which are supplied with the new dividends $1^t$.

In the subtraction chart shown in Fig. 7, the subtraction of any of the problems comprising the minuend $h^2$ and the subtrahend $h^3$ gives a remainder, not shown in the drawing, which will be found to contain the two series of alternate figures decreasing or increasing in one or the other direction according to the method above exemplified for multiplication and division, and in accordance with the construction of the problem.

In Fig. 8 the remainders $h^4$ from the lines of minuend $m$ and the subtrahend $s$, decrease from left to right in two alternate series as 6, 7 and 4, 3. The column of subtrahends $t$ exhibits the results set down by the pupil and indicated by the characters making up the problem.

In the addition chart shown in Fig. 9, the elements which go to make up the problem are arranged in problem columns as indicated by the indicia $j^2$, as "section D", "section E," "section F," etc., and each problem column is set off into group problems comprising at least three members as $m$, $n$, $o$ of said problem extending horizontally across the chart and orderly disposed one above another. Any desirable number of lines and columns of problem numbers may be provided on the chart. The alternate problem numbers of each column are provided with a number character $q$ as A, B, etc. Two movable guide sheaths $u$ and $v$ extend horizontally across the chart and the left and right margins of the charts are provided with graduations $w$ arranged in pairs, the graduations $w$ being arranged just above numbers which are horizontally alined with each other. The graduations $w$ are arranged in a line with alternate horizontal spaces $x$ of the chart which separate the lines of numbers of the problem. The number characters $q$ on the left margin of the chart are placed under the graduations $w$ respectively and are employed to indicate results from the addition of any column of numbers within the section, the length of said column being determined by the graduations marked $w$ below the number character $q$.

The sheath $u$ is provided with a cut-off to determine the length of such column without confusion and in Fig. 9 is set at the graduation marks $w$ immediately below the initial number character $q$.

In this construction of the chart the initial number characters $q$ are the upper case letters "A," "B," etc., the value of each letter being determined by its position in the alphabet, "A" thus representing the numeral 1; "B," the numeral 2, and so on. Consequently, in reading the answer determined by the upper sheath $u$ in Fig. 9, the character "B" is read as the initial number "2" of the answer "272,635." In like manner the answer indicated in "section E" is "267,584" and that in "section F" is "245,342." As the slide $u$ is moved down the addition performed above such slide will give the amount indicated by the character numerals "C", "E", "F", "G", "H", etc., and the permanent numbers which they initial, respectively.

The initial numeral characters at the right of the margin of the chart indicate the answers resulting from adding the column numbers from the bottom of the chart to the lower edge of a sheath adjusted for cutting off the top of the columns instead of the bottom. For this purpose the lower sheath $v$ is removed or shoved up.

The answer completing numeral characters $q'$ in the right margin of the chart shown in Fig. 9, increase from the bottom of the chart upward and indicate, respectively, the initial numeral of the answer number of each section which is in line with such numeral character. The answer numbers thus indicated are the sums of the numbers in the columns respectively from the bottom of the chart, to and including the number immediately above such number answer.

Thus in Fig. 9 the character "H" in each margin indicates an initial numeral 8; and when such numeral is placed before the number in "section D" alined with the numeral character "H" located in the left margin of the chart; said character "H" makes the answer number read "856,453," which is the amount obtained by adding all of the numbers found in the columns of "section D" from the top of the column to and including the number 0' immediately below the line in which said left hand character "H" is located. In "section E" the answer not directly shown, but capable of being read is "864,534," and in "section F," the answer is "837,281."

The answers indicated by the initial character "H" of the right margin are 823,121 for "section F," 840,313 for "section E," and 831,202 for "section D." These three answers are the amounts, respectively, obtained by adding the numbers in the columns respectively, from the bottom up to the lower edge of the upper sheath $u$ which is practically at the graduation marks $w$ one line higher than the line in which the right hand character "H" is located. For setting off the columns to be added for obtaining the amounts of the answers initialed by the left hand character "H," the upper sheath will be removed or will be moved down to the graduations $w$ below the line of numbers next below the line in which the left hand character "H" is located. Then the student may perform the additions of the three columns and may note the alternating key numbers of his answers before submitting his work to the inspector.

The key to these produced answers involving the initial number character is not for the student.

The inspector having the key involved in the initial key characters $q$, $q'$ may read the answer numbers independently of any addition process and may use said answers advantageously in framing test problems not found on the chart.

The student will usually not be given any key except that afforded by the increasing or decreasing alternating figures in the amounts obtained by his own work.

In order to increase the number of problems available on the chart, additional initial numeral characters $y$ and $z$ are provided in separate intermediate columnar spaces $y'$, $z'$; the one reading downward in regular alphabetical order, and the other reading upward in like order.

These initial number characters $y$, $z$, are lower case letters to distinguish them from the upper case letters $q$, $q'$ at the left and right margins and indicate the initial numeral of the answers respectively corresponding to the amounts of separated portions of the column in " section D," " section E " and " section F," respectively, when measured upward from the foot-markings $w^2$ and downward from the head-markings $w^3$.

In order to determine the amount obtained by adding the numbers found between the sheaths $u$, $v$, without doing the work, the lower sheath will be placed with its upper edge at the foot marks $w^2$, and the upper sheath will be placed with its lower edge at the appropriate graduations $w$ thereabove. The answers may then be read by the inspector without the performance of any work of addition, by simply noting the initial numeral indicated by the lower case letter in the column in which such lower case letters read upward in alphabetical order. By placing the lower edge of the upper sheath at the head marks $w^3$ the answers may be read by use of the lower case letters reading downward in alphabetical order; the lower sheath, in this case being shifted and placed with its upper edge at the appropriate graduation marks $w$. The required answer in each case is found in the line of the highest letter, in alphabetical order, of the descending lower case column of initial number, characters $y$. That is to say; by reference to the lower case initial number characters $y^2$ the problem will be determined by the numbers contained between the foot-marks $w^2$ and the number immediately above the line containing a number character $y^2$ in the right hand column of lower case letters. Said right hand column reads from the bottom up and the letters bear a value corresponding to the alphabetical position of the letter. Thus the sum of all the numbers in " section D " between the sheaths $u$ and $v$ is 531,202; in " section E " it is 540,313 and in " section F " 523,121, and so on.

In order to use the column $y$ of number characters the lower edge of the upper sheath $u$ will be set at the head marks $w^3$. Then the answers will be indicated by the descending column of lower case letters. Thus if the upper sheath $u$ were set with its lower edge at the head marks $w^3$ and the lower sheath were set with its upper edge at the graduations $w$ just above the character "H" the sum of the numbers between the two sheaths would be 439,485 in " section D"; that in section E " would be 438,495 and in " section F " 447,586, and so on.

In Fig. 10 each line $h^5$ of individual answers for any series is made up of two series of numbers "9", "10", and "8", "9".

In Fig. 11 the answers $h^6$ vary in orders of 2.

In Fig. 12 the series of alternate answers "16", "15", and "14", "13" differ by a difference of 1 in the line at $h^7$.

Figs. 10, 11 and 12 give illustrations respectively of two-number column, three-number column and four-number column addition.

In Fig. 12 cipher keys for the line addition are shown in a column at the left at $x^5$, the key-word of this cipher being "precaution", so that the characters $pe$ indicate 13 as the sum of the characters 4342. In the next to top line the characters $rp$ indicate the answer 21 as the sum of the line addition of characters 7563, and so on.

The characters $ai$ in the line of answers 16, 14, 15, 13 indicate that the sum of the answers shown in the footing line equals 58.

In the answers indicated on the chart shown in Fig. 9, the same alternate key system prevails throughout, that is to say, the answer numbers run in alternate series; as 7, 6, 5, and 3, 3, in the answer for the addition above the sheath in "section D". The initial numeral 2, for completing the answer is not shown, but is indicated by the letter "B". The initial numerals thus indicated do not ordinarily key.

It is thus seen that the keys are supplied within the answers by digits arranged in an order that is recognizable and that may be increasing either from left to right or from right to left; and that the incremental factor may be any convenient number as 1 or 2. This increment may apply to any series of the numerals but it is deemed most desirable to have the number constituting the completed answer, to involve two series of digits; the digits of one series being arranged in alternation with the digits of the other series and each increasing along the number by an increment that is uniform within the series.

The chart of Fig. 6 is provided with permanent figures or numbers and markings, as the permanent dividends $1^e$ and $1^f$, and permanent divisor $1^g$, and the order of arrangement of the elements of the chart which are to graphically indicate the correctness or incorrectness of the answer does not appear until one entire line of problems has been solved and the answers written in their due order on the chart.

The permanent numbers and marks as at $a'$, $e'$, $g'$, $a''$, $e''$, $a^2$, $b^2$, $d^4$, $d^5$, $d^6$, $d^7$, $d^8$, $1^e$, $1^i$, $e^4$, $h^2$, $h^3$, $m$, $s$, $m'$, $m''$, $m^2$, $w$, $w^2$, etc., throughout the entire series of cards are carefully calculated to involve in each graphically expressed problem an answer which, when written, will afford a graphical key to establish either the correctness or incorrectness of the work and instantly recognizable so that the inspector can properly visé the work without conning the problem or even the answer.

That is to say, by this invention it is made unnecessary for the teacher in charge of a school to con any part of the results of the work done by the pupils, the absence of the known order of which must appear in the correct answer indicating the presence of an error which the teacher may at once check and give direction for reworking.

It is to be particularly noted that in the preferred form shown in the drawings the answers involved in the various problems presented on the different cards or sheets are made up of digits in orderly arrangement and that the orderly digits in the answers increase and decrease from left to right in some instances and from right to left in other instances, and that one set of alternate digits in one answer may increase from left to right along the answer while the other set of alternate digits in such answer may increase from right to left along the answer. In other instances both may increase from right to left along the answer; and in still other instances both may increase from left to right along the answer. The order in one answer is purposely made different from the order in another answer. The order and the difference of increase and decrease is made variable in the answers so as to eliminate the possibility of self-deception, either unconscious or intended and to prevent the student from forecasting the answer from an incomplete result.

In Fig. 13 the answers are zigzag being contained in two parallel lines of figures which go to make up, that is to say, that constitute a part of the problem. For example, the answer to the problem given by placing a paper at the line $w$ just above $c$ is found by initialing the number with "2" the value of B and then zigzagging from the number in line B to and from the number in the line just above C. Thus 283746. The answer may thus be readable by the teacher who has the secret key and may be proved by the pupil who is informed of the self key of the answer. That is to say, when the pupil has solved the problem the key numerals 8—7—6 and 3—4 assure him that his answer is correct; but the teacher, having the secret zigzag key is able to know at a glance the answer to any problem before making the addition. The increment of the key may be changed to add interest and increase the mental activity and the independence of the pupil without disturbing the secret keying of the problem and to this end the unit digit may be thrown out of key by one or more. Thus, in the problem at line D of section A in Fig. 13 the problem involves the answer 316254 which is found by zigzagging from line C to and from the line just below but only exhibits the key numbers 1—2 and 6—5. For the purpose of completing this key so as to inform the teacher, or the pupil if so desired, the line $w'$ at D is supplied with an indicator in the form of a dot $r$ which indicates that the units digit of the answer is raised by unity above the key order, and that the units digit is two greater than the hundreds digit; the answer in this instance being 316254. The same principle is exhibited at the line K at left margin where the answer indicated at line J at the left and the line just below, is 1042537.

The like indication may be used in addition from or to the bottom. The dot $r'$ below the line at L in the right hand margin shows that the indicated zigzag answer is 1121305; the key in line K being 2—3—5 instead of 2—3—4, the regular order.

A convenient way to use the addition cards is to place a book or card just above or at the line below which the addition is to be made. This sets off the problem for the time being. For example, placing a book with its lower edge at the line I, found in the right hand margin, gives 827365 the key numbers being 2—3—5 and 7—6. It may happen as in this instance that the initial digit may key as 8—7—6 but this is not practically a part of the system, and is not to be expected. The two dots $r''$ indicate that the key figures may increase by two instead of by one. The digits 2—3—5 conform to this indication.

Another key feature is produced by systematically arranging the elements of the problems respectively in sets of horizontal lines and vertical columns, and providing at the ends of the lines and at the bottoms of the columns answer spaces $a^3$, $a^4$, $a^5$ to receive answers $a^6$, $a^7$, $a^8$, respectively.

The lines answers $a^6$ at the ends of the lines when treated by the process pertaining to the problem, give the check or key answer $a^8$, and this is true with the column answers $a^7$ at the bottoms of the columns.

This arrangement is shown as applied in addition, subtraction, and multiplication. See Figs. 10, 12, 8 and 3.

In Fig. 14 the problems are arranged in lines and columns and in groups $14^a$, each of which groups consists of printed elements as follows:—a lower dividend 14$^b$, an upper dividend 14$^c$, the lower parenthesis 14$^d$, the known divisor 14$^e$ for the lower dividend 14$^b$ and the upper parenthesis 14$^f$. The parentheses or division indicators 14$^f$ and 14$^d$ are arranged, one above another, and the known divisor 14$^e$ is arranged on the opposite side of the parentheses 14$^d$ from the lower dividend 14$^b$. The groups also contain the equals sign 14$^g$ at the right of the upper dividend.

The pupil's key is in the final quotients that are derived by the pupil and set in the blank quotient spaces 14$^h$ immediately following the equals sign and the pupil's key is in such final or derived quotients; the problems of each group being so constructed that the adjacent final quotients of each line will differ from each other by two.

The problems are solved in each group by dividing the lower dividend by the lower divisor and placing the quotient at the left of the division parentheses 14$^f$. The first quotient constitutes the divisor for the upper dividend, the division of which by such divisor produces the final quotient, that is set down by the pupil in the appropriate space 14$^h$. When all of the problems of any line have been solved properly, the final quotients exhibit the key that proves the correctness of the work. To this end the adjacent final quotients of any line of the whole number problems differ in one or the other direction by two.

The teacher's key in these groups is found in the relation between the two printed dividends 14$^b$ and 14$^c$ which establishes the key ratio. The first dividend quotient 14$^k$ is of the same ratio to the upper printed dividend 14$^c$ as the second derived quotient 14$^h$ is to the printed divisor 14$^e$, and such ratio is the same as that between the printed dividends.

In the lines of problems containing fractions, the denominators $m^{14}$, of the fractions in the final quotients, key in the same manner as the whole numbers in the other final quotients.

In Fig. 15 the problem sheet is constructed as a game for small children. In some of the inclosures or pens $bn$ there are marks $cn$ to represent the pigs, and there are also numeral characters $dn$ corresponding to the numbers of pigs in such inclosures. The numerals $dn$ are arranged to form a line of numbers, the elements of which are arranged to produce the tail column of answers $fn$, and the columns of such numerals $dn$ are arranged to produce the foot line of column answers $hn$. The answers in the foot line of column answers $hn$ are adapted to combine to form the key number $a^s$, which is also the result obtained by adding the column of line answers $fn$. The line of column answers $hn$ contains the key which in this instance is made up of digits the alternate ones of which differ by one, as 4, 5 and 6, 7, while the final answers $a^s$ are key numbers that differ by 2, as 10, 12.

In Fig. 16 the problem sheet is constructed the same as in Fig. 15 but the numbers are arranged for subtraction. The minuend $jn$ and subtrahend $kn$ are arranged in the pens $bn$, and the remainders $pn$ and $qn$ form new minuends and subtrahends to form new remainders that constitute the key numbers $a^s$. The line remainders $rn$, as well as the column remainders $pn$, $qn$ produce the common key numbers $a^s$, respectively. The lines of column remainders $pn$, $qn$ key by differing by unity; as 4, 5 and 2, 1; or 6, 7 and 3, 2; while the key numbers $a^s$ of any line of answers differ by two; as 2, 4; or 3, 5.

It is thus seen that the application of the principle is available for various grades and to various processes and that accuracy may be attained with a minimum of care, time and attention upon the part of the teacher; who is thus enabled to devote more time to the observation of the pupils rather than to the detection of errors; and that greater enthusiasm, interest, attention, confidence and satisfaction upon the part of the pupil is secured, thereby lightening the labors of both pupil and teacher and gaining more rapid and effective progress.

It is thus seen that the invention is adapted to wide and various application and that it may be employed in both abstract and concrete test and practical problems of all kinds where numbers or their equivalents appear in the answers; and that it is thus made possible to place text books and the like on the substantial basis of accuracy which is attainable only by establishing and proofing the answers to the problems respectively, and that the instructor is relieved of the overwhelming task of working the problems and at the same time does not give the student any aid to dishonest work nor deprive him of the sense that he is regarded as worthy of confidence; but on the contrary gives him a zest and an incentive that keeps the mind active, resilient and responsive to the work.

Various methods of use in specific cases may present themselves to the practical educator and I do not limit the invention to the specific forms or uses illustrated herein but may extend the practice of the invention indefinitely within the scope of the appended claims.

I claim:—

1. A keyed educational device provided with a graphical problem the elements of which inherently involve an answer containing elements arranged in a predetermined order and calculated to be made visible by the correct written answer for the purpose of enabling inspectors to properly visé a student's work without reading a separate answer.

2. An inherently keyed drill problem sheet comprising numbers arranged in a predetermined relation which indicates certain problem-solving processes and involves a certain answer, elements of which will appear in a definite order when the answer is complete; for the purpose of presenting to the eye of an inspector a key in the correct answer which is not likely to occur in an incorrect result.

3. An inherently keyed drill problem sheet comprising numbers arranged in a predetermined relation which indicates certain problem-solving processes and involves a certain answer, elements of which will appear in a definite alternating order when the answer is complete; for the purpose of presenting to the eye of an inspector a key in the correct answer which is not likely to occur in an incorrect result.

4. A numerical problem chart containing problems comprising numbers arranged to indicate a common mathematical operation for the problems; said numbers being prearranged to involve answers the numerals of which answers, when written, present to the eye an order of arrangement common to said answers; so that an inspector of the work may satisfy himself of the correctness of the same by simply noting the order and without conning the numbers making up the answers.

5. An educational device provided with a problem, the elements of which inherently involve an answer containing alternate elements arranged in an order which is determinable from said answer when written.

6. An educational device provided with a problem, the elements of which inherently involve a result containing alternate elements arranged in an order determinable only from said result.

7. An educational device, provided with groups of problems, the elements of which inherently involve results containing alternate elements arranged in an order determinable from all said results.

8. An educational device, provided with groups of problems, the elements of which inherently involve results containing alternate elements arranged in an order determinable only from all said results.

9. An educational device, provided with groups of problems, the elements of which inherently involve results containing elements arranged in an order determinable only from all said results.

10. An educational device, provided with a problem, the elements of which inherently involve an answer containing elements arranged in an order which is determinable from said answer when written.

11. An educational device, provided with groups of problems, the elements of which inherently involve results containing elements arranged in an order determinable from all said results.

12. An educational device provided with a problem, the elements of which inherently involve a result containing elements arranged in an order determinable only from said result.

13. A problem sheet provided with columnar sections of numbers going to make up the problem, the numbers in the sections being in columnar form and also in horizontal lines, index characters applied to the separate columns of figures in the problem columns, and other index characters applied to the horizontal lines of numbers and indicating respectively numerals to be prefixed to the columnar numbers in the line in which the index character appears.

14. An arithmetical problem sheet comprising numbers and marks indicating mathematical processes and involving an answer containing alternate digits increasing along the answer by a common increment.

15. A problem sheet comprising numbers arranged in columnar sections, in horizontal lines, and in a plurality of digit columns; index characters for the sections; index characters for the digit columns; an index character for the horizontal lines, the numbers in any column and in any line involving an answer having an order of digits which increase in one direction.

16. A drill problem sheet provided with a plurality of sections containing problem columns of numbers arranged in superposed lines; the numbers in said lines being horizontally alined with each other; graduations to indicate cutting off a set of problems the elements of which problems involve answers, the digits of which answers increase in regular order along the answer.

17. A drill problem sheet provided with a plurality of sections containing problem columns of numbers arranged in superposed lines; the numbers in said lines being horizontally alined with each other; graduations to indicate cutting off definite problems, the elements of which problems involve answers, digits of which answers increase in regular order along the answer in alternation with other digits of the answer.

18. A drill problem sheet provided with a plurality of sections containing problem columns of numbers arranged in superposed lines; the numbers in said lines being horizontally alined with each other; graduations to indicate cutting off definite problems; the elements of which problems involve answers the digits of which answers increase in regular order along the answer in alternation with the other digits; and the other digits likewise arranged to increase along the numbers by a certain increment.

19. A drill problem sheet provided with a plurality of sections containing problem columns of numbers arranged in superposed lines; the numbers in said lines being horizontally alined with each other; graduations to indicate cutting off definite problems, the elements of which problems involve answers the digits of which answers increase in regular order along the answer; a number above the first number, thus cut off; the same being provided with numerals measurably indicating the orderly answer involved in the numbers above said graduations.

20. A drill problem sheet provided with problems, the elements of which involve answers in which alternate digits increase in one or another direction with a definite increment and in which sheet the direction of increase in the definite answers is variable.

21. A problem sheet provided with problems containing elements that involve answers for the problems respectively in which the alternate digits in one of the answers increase from right to left with a definite increment and the other digits increase from left to right with a definite increment.

22. A self keyed drill problem device of the character set forth in which the answer is made up of digits arranged in zigzag relation in two parallel numbers that go to make up the problem of such device.

23. A self keyed drill problem device of the character set forth in which the answer is made up of digits arranged in zigzag relation in two parallel numbers that go to make up the problem on such device; said answer digits being in orderly arrangement along the answer.

24. A self keyed drill problem device of the character set forth in which the answer is made up of digits arranged in zigzag relation in two parallel numbers that go to make up the problem on such device; said answer digits being in orderly arrangement along the answer; said answer digits in one of the numbers increasing by a common difference along the answer and said answer digits in the other number increasing by a common difference along the answer.

In testimony whereof, I have hereunto set my hand at Los Angeles, California, this 3d day of July, 1918.

FREDERICK D. JONES.

Witness:
JAMES R. TOWNSEND.